June 23, 1953  N. M. GREENE  2,643,321
MANUALLY OPERATED SOLDER FEEDER
FOR ELECTRIC SOLDERING IRONS
Filed July 28, 1951  2 Sheets-Sheet 1
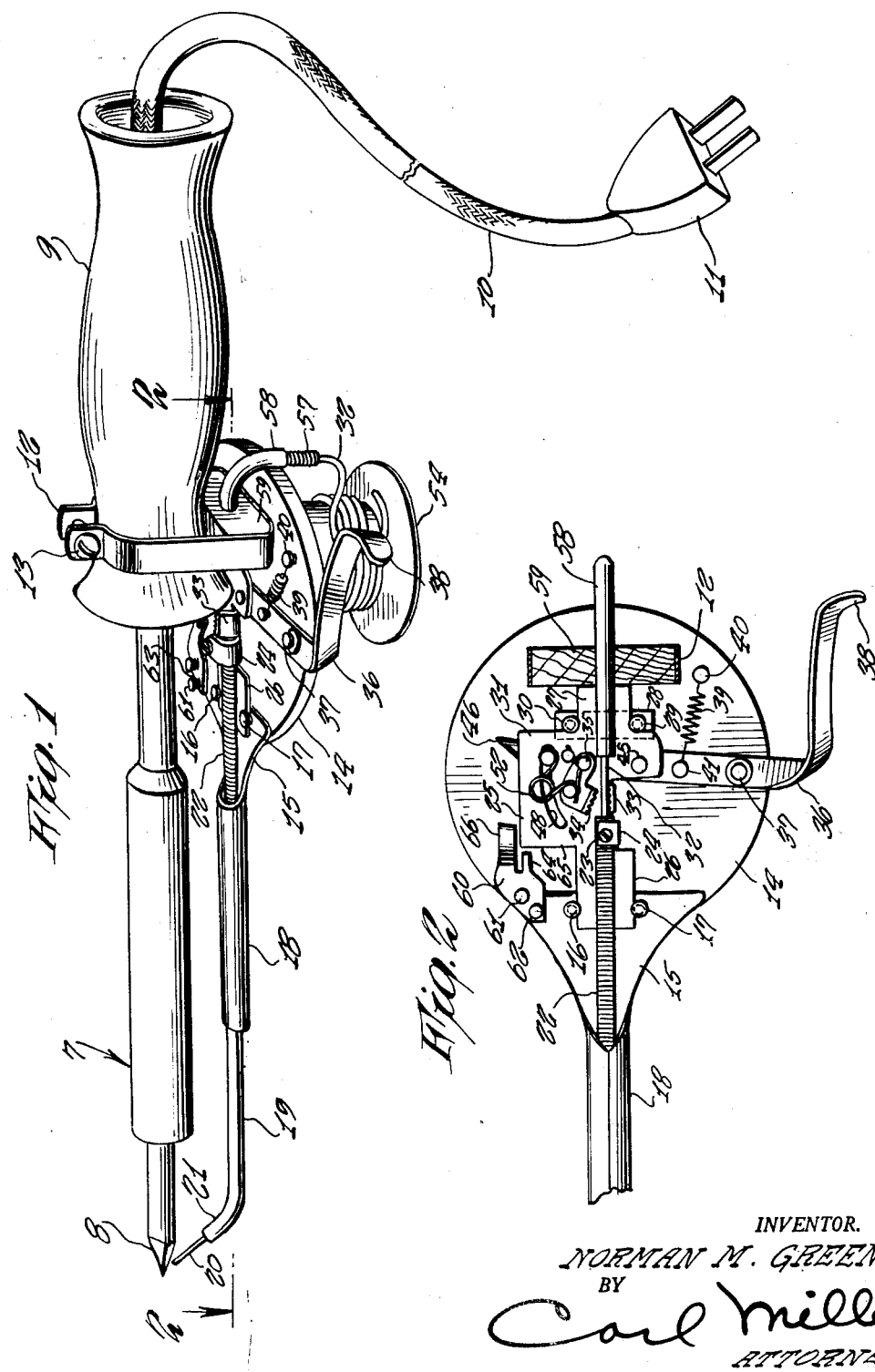
INVENTOR.
NORMAN M. GREENE
BY
Carl Miller
ATTORNEY

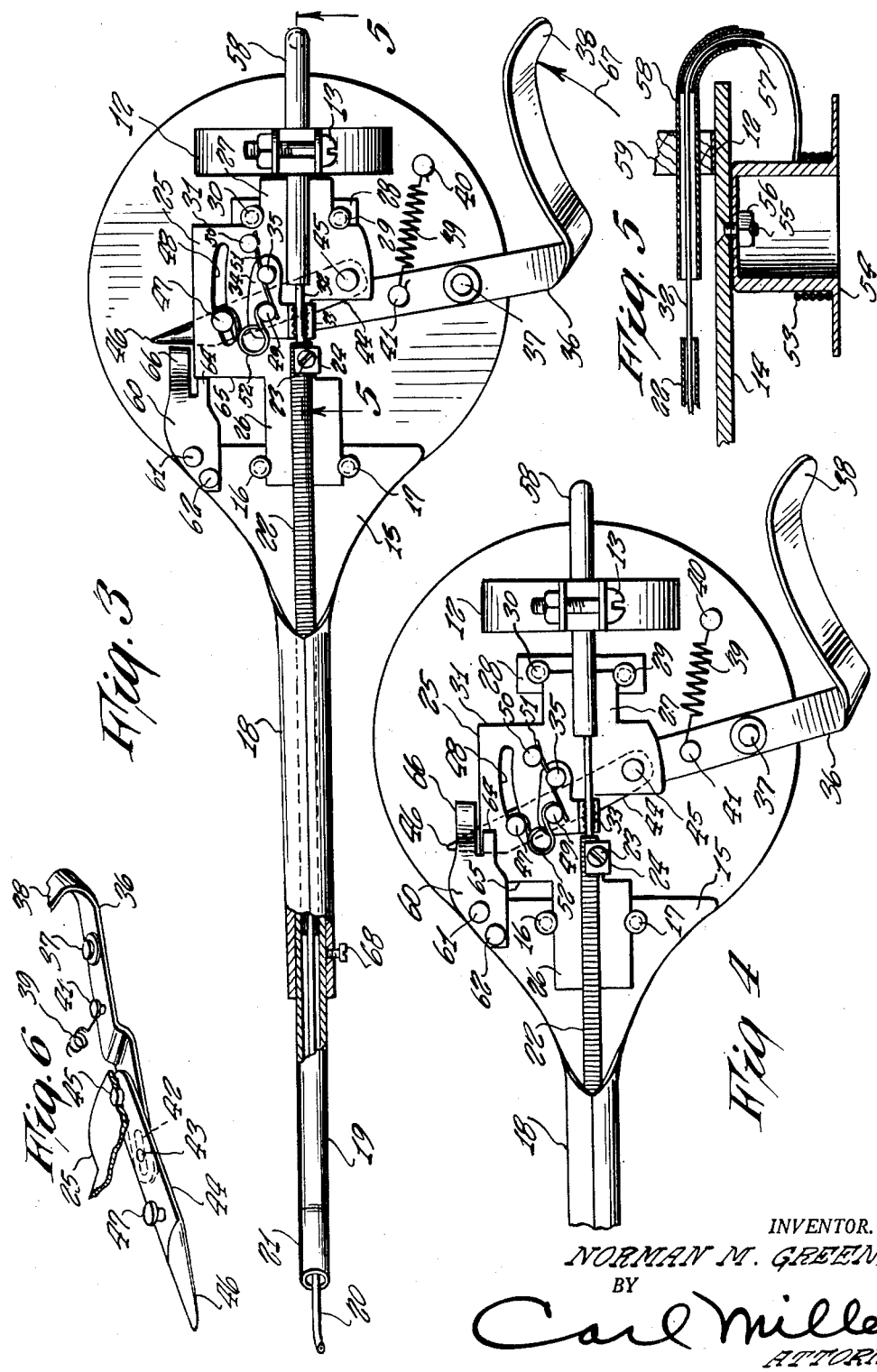

Patented June 23, 1953

2,643,321

UNITED STATES PATENT OFFICE 2,643,321

MANUALLY OPERATED SOLDER FEEDER FOR ELECTRIC SOLDERING IRONS

Norman M. Greene, Valley Stream, N. Y.

Application July 28, 1951, Serial No. 239,075

2 Claims. (Cl. 219—27)

The present invention relates to attachments for electric soldering irons and the like, and particularly to a solder feeding attachment for such soldering irons.

The main object of my invention is to provide an electric soldering iron with means for feeding solder to the point at will without the necessity of handling the solder directly but carrying a supply thereof on a portion of said soldering iron.

Another object is to have an attachment for the handle of an electric soldering iron by which it is possible manually to feed step by step a piece of wire solder to the soldering point by a simple manipulation of a lever.

A further object is to have such an attachment for feeding solder to the iron that normally carries a spool or reel of solder wire capable of being readily replaced by a fresh supply when empty.

It is an important object of the invention to make an attachment of character indicated so light and yet so effective that its weight will in no way encumber a soldering iron but will allow full freedom of action for soldering operations.

It is likewise an object to make such an attachment as relatively simple as possible and reasonable in cost as to encourage general adoption in the trade.

Other objects and advantages of this invention will appear in further detail as the specification proceeds.

In order to facilitate ready comprehension of the invention for a proper appreciation of the salient features thereof, the invention is illustrated on the accompanying drawings forming part hereof, and in which:

Figure 1 is a perspective view of a solder feeder for an electric soldering iron shown with the latter and embodying the invention in a practical form;

Figure 2 is a fragmentary plan view partly sectioned off and taken on line 2—2 in Figure 1;

Figure 3 is a plan view of the attachment alone shown with the operating lever partly actuated or operated;

Figure 4 is a fragmentary view similar to Figure 2 or 3, and showing the lever fully operated;

Figure 5 is a fragmentary longitudinal section taken on line 5—5 in Figure 4; and Figure 6 is a fragmentary perspective view of the operating lever and parts linked or related thereto for operation.

Throughout the views, the same reference numerals indicate the same or like parts.

Any mechanic who has occasion to use a soldering iron is aware that the operation of soldering is not only a test of skill, but also of dexterity and patience. Usually, it is necessary to manipulate the solder wire or bar as well as the soldering iron, and sometimes either handle or balance one of the parts to be soldered in addition. Such complex operation taxes a mechanic's ingenuity to the utmost, and poor results are thus always a threat. If the soldering iron alone requires to be handled, the problem is greatly simplified, and I have therefor devoted some attention to this problem from the standpoint of relieving an operator from the need of directly handling solder in any form.

As a result, I have succeeded in producing a light and effective attachment for an electric soldering iron that carries the solder in a convenient form and in position to be fed as desired to the hot point of the iron, as will now be set forth in detail in the following.

Hence, in the practice of my invention, and referring also again to the drawings, an electric soldering iron, generally indicated at 7 has a heated soldering point 8 and a handle 9 through which a conductor 10 extends from the plug 11 adapted to be inserted in an outlet. Upon the handle 9 is secured a strap metal clamp 12 by a clamping bolt or screw 13, the yoke portion of this clamp being fixed by rivets or other means to a paddle shaped plate 14 forming the main frame of the attachment embodying the invention. This plate has a forwardly projecting guide plate 15 secured by studs 16, 17 to the plate, both having heads spaced a short distance above the guide plate for a purpose that will presently be explained. This guide plate is extended forward beyond plate 14 and formed into a protective tube 18 provided with a further forwardly extending relatively smaller tube 19 for guiding solder wire 20 to the soldering point 8, the extreme end 21 of tube 19 being bent toward the point for final direction of the solder to this point.

Into the rear entrance portion of the tubular part 18 of guide plate 15 extends a resilient wire coil guide 22 for receiving and guiding the solder wire into tube 18 to smaller tube 19. The rear end of flexible tube 22 is secured by a screw 23 in a bracket 24 on a solder feed plate 25. A forward portion 26 of this plate rests slidably on the rear end of guide plate 15 between studs 16 and 17 beneath the heads thereof which serve to confine portion 26 in contact with feed plate 25, while allowing the latter plate to slide forwardly and rearwardly during operation. The rear end 27 is alined with forward portion 26 of the same plate and rests slidably on a small spacing plate 28 secured on base plate 14, the spacing plate 28 having a pair of headed studs 29, 30 slidably retaining feed plate portion 27 in contact with this spacing plate.

The feed plate 25 has at least one rear shoulder 31 engaging against one stud 30 to limit rearward movement of the plate, and in addition has facilities for gripping and feeding the solder wire at an intermediate point 32. One such means includes a fixed jaw 33, while upon plate 25 is pivotally mounted a movable jaw 34 co-operating with stationary jaw 33 by means of a pivot stud or pin 35. In order to move the feed plate, a manually operated lever 36 is pivoted by means of a pivot stud or screw 37 upon base plate 14 and terminates in an outer bent end 38 serving as a finger piece by which to operate the lever by the finger when the soldering iron is held in the hand. A return spring 39 is connected to a stud 40 on the base plate and to a stud 41 in the lever tending to return the lever rearwardly to original position when operated. The other end of this lever has a longitudinal slot 42 (Figure 6) receiving the intermediate pin 43 upon a swingable link 44 that in turn is pivoted by a pin 45 at one end to feed plate 25. The other end of link 44 is formed into a beveled pointed portion 46, but within this end is fixed a stud 47 that extends upward through an arcuate slot 48 in feed plate 25, the curvature of this slot being formed on a radius centered on pivot pin 45 so that arm or link 44 may swing about its pivot 45 as far as stud 47 moving through slot 48 will allow.

If the finger piece 38 is pressed by the finger toward the soldering iron handle 9 tensing spring 39, the link 44 will be swung forwardly to the left about its pivot 45 until stud 47 strikes the end of arcuate slot 48, which will cause the feed plate to slide forwardly between studs 16, 17 and 29, 30. However, the movable jaw 34 is provided with a stud 49 upon its forward portion, and to co-operate with the same and also its pivot stud or pin 35, a stationary pin or stud 50 is fixed on the feed plate adjacent to the movable jaw to accommodate a wire spring 51. This spring has one end extending over plate stud 50, then around pivot pin 35 and after this extends past stud 49 on jaw 34, in such fashion, that if this jaw is moved down toward stationary jaw 33, the spring tends to return this jaw to open position as shown in Figure 2.

A further wire spring 52 is also provided, being mainly a coil spring having one end partly coiled about stud 47 on link 44 and the other similarly coiled about jaw stud 49, so that when the link stud 47 is substantially close to or over jaw stud 49, the jaw 34 will be resiliently pressed down toward stationary jaw 33, gripping the solder 32 between them as shown in Figures 3 and 4. When stud 47 is located at the rear end of slot 48 as shown in Figure 2, stud 47 is distant from jaw stud 49, allowing spring 52 to relax and allow the movable jaw to open away from jaw 33 in rearward position of feed plate 25, the jaws being separated by spring 51 so that rearward movement accomplished by return spring 39 with respect to lever 36 will occur without the jaws gripping the solder.

The wire solder is provided in the form of a supply coil 53 on a reel or spoon 54 mounted beneath base plate 14 by means of a screw or bolt 55 and retained by a nut 56 on this bolt. The wire solder 32 extends up through a flexible tube 57 from the reel into a fixed tube 58 extending rigidly forward through a block 59 of insulating material secured within clamp 12. In the space between the tube 58 and rear end of flexible tube 22, the solder 32 may be gripped by the jaws 33 and 34.

Upon base plate 14 is carried a latch plate 60 retained in position by a pair of studs 61, 62 extending loosely through this plate into guide plate 15, a pair of small compression springs 63 being mounted on the studs beneath the heads thereof to retain the latch plate normally down upon the guide plate. This latch plate is formed with a stop 64 projecting rearwardly toward the feed plate to engage against the forwardly facing shoulder 65 thereon and prevent forward feeding movement thereof until desired. To release the latch stop 64 from shoulder 65 of the feed plate, the latch plate has a rearwardly projecting downwardly and then upwardly curving finger 66 adapted to be engaged beneath the same by the beveled end 46 of link 44.

The arrangement is such that when the lever 36 is pressed by the finger in the direction of arrow 67 (Figure 3), it will tend to swing link 44 forward toward guide plate 15 about its pivot pin 45 on the feed plate, and as the latter is prevented from moving by stop 64 engaging against shoulder 65, the link is swung forward until its stud 47 approaches the forward end of slot 48. During such movement, spring 52 becomes compressed or closed and overcomes small spring 51 and closes jaw 34 toward jaw 33, gripping the solder 32 while the feed plate is still in its rear locked position. At this point, the beveled end 46 of link 44 begins to enter beneath release finger 66 of latch plate 60 and when stud 47 of the link reaches the end of slot 48 in the feed plate, the wedge portion or end 46 will also have raised finger 66 sufficiently to raise plate 60 with its stop 64 out of the path of shoulder 65 of the feed plate.

The feed plate being then free of obstruction will be moved by lever 36 through link 44 to slide between studs 16, 17, 29 and 30 in the direction of guide tube 18. As the jaws 33 and 34 are gripped upon the solder 32, they shift this solder with them from the position of Figure 3 to that of Figure 4, thus feeding a short length more of solder wire at 20 out through the nozzle or end 21 of tube 19. To ensure the latter being held in place, a screw 68 in tube 18 engages against this tube 19, while the forward end of flexible tube 22 extends within tube 18 into tube 19 to provide reliable guidance to the solder wire 32.

As soon as the lever 36 is released, spring 39 returns it to the original starting position shown in Figure 2, wherein spring 52 is relaxed and the smaller spring 51 opens the jaws so that the feed plate may slide rearwardly without withdrawing the solder from attained advanced position.

It is thus seen that by a mere manipulation of the operating lever 36 by the finger, the solder 32 will be advanced a step and fed to the soldering point 8 at will and in a simple and convenient manner without individual attention being required to the solder.

While I have stated that tubes 22 and 57 are resilient or flexible wire coil tubes, they may naturally be of any material suitable for the purpose and may simply be flexible metal or plastic tubes, as desired. The base plate 14 may be of metal or plastic, and the various link and plate parts may also be of metal or plastic if desired, lightness being of course a requirement in addition to durability.

Manifestly, variations may be resorted to and parts and features may be modified or used without others within the scope of the appended claims.

Having now fully described my invention, I claim:

1. In a soldering iron having a handle with an electrically heated soldering tip or iron proper, a manually operated solder feeder including a substantially flat base plate disposed beneath the forward portion of the handle and a portion of the intermediate portion of the soldering iron, an upwardly extending clamp fixed on the base plate and secured to the handle, a wire solder reel pivotally mounted upon the underside of the base plate to rotate about a vertical axis, a plate member fixed upon the forward portion of the base plate and formed forwardly into a tubular wire solder guide, a solder guide tube secured in the tubular portion of said plate member and extending forwardly toward the soldering tip, a further solder guide secured upon the rear portion of the base plate in the lower portion of the clamp for guiding solder wire from the reel across the base plate toward said tubular portion of said plate member, a feeding plate slidably mounted upon said base plate for limited forward and rearward movement thereon, a solder gripping jaw fixed on the feeding plate at one side of the path of movement of the solder wire directed toward said plate member, a pivotally mounted solder gripping jaw on said feeding plate at the other side of said path adapted to pivot about a vertical axis, a manually operated lever pivotally mounted on said base plate and extending beneath said feeding plate, and resilient means interconnecting the end of the lever remote from the manually gripped portion thereof and the feeding plate and simultaneously the pivotally mounted jaw so that operation of said lever effects closure of said pivoted jaw against the solder and the first mentioned jaw and forward feeding movement of said feeding plate.

2. A manually operated solder feeder according to claim 1, wherein the feeding plate has a clearance slot and the lever carries a stud projecting up through the slot, a wire spring connected to said stud at one end, a stud upon one end adjacent to the solder gripping portion of the pivotally mounted jaw connected to the other end of said wire spring, the latter having a coiled intermediate portion between the ends thereof, a second wire spring coiled about the pivot mounting of the pivotally mounted jaw and having one end engaging with said stud on said pivotally mounted jaw, a stud fixed upon said feeding plate adjacent to the latter jaw engaging with the other end of said second wire spring, and a stop on said base plate for receiving the end of said manually operated lever, said stop being mounted beyond the feeding plate and having a portion spaced above the same a short distance in order to frictionally engage with the end of said lever and retain the same in operated position at will.

NORMAN M. GREENE.

References Cited in the file of this patent

UNITED STATES PATENTS

| Number | Name | Date |
|---|---|---|
| 2,254,521 | Gardner | Sept. 2, 1941 |
| 2,303,947 | Moore | Dec. 1, 1942 |
| 2,438,525 | Walters | Mar. 30, 1948 |
| 2,466,056 | Smoke | Apr. 5, 1949 |